June 19, 1962  A. TRINKLER  3,039,988
REGULATION AND ADJUSTMENT OF THE RATES OF FLOW OF LIQUID
Filed July 26, 1960  4 Sheets-Sheet 1
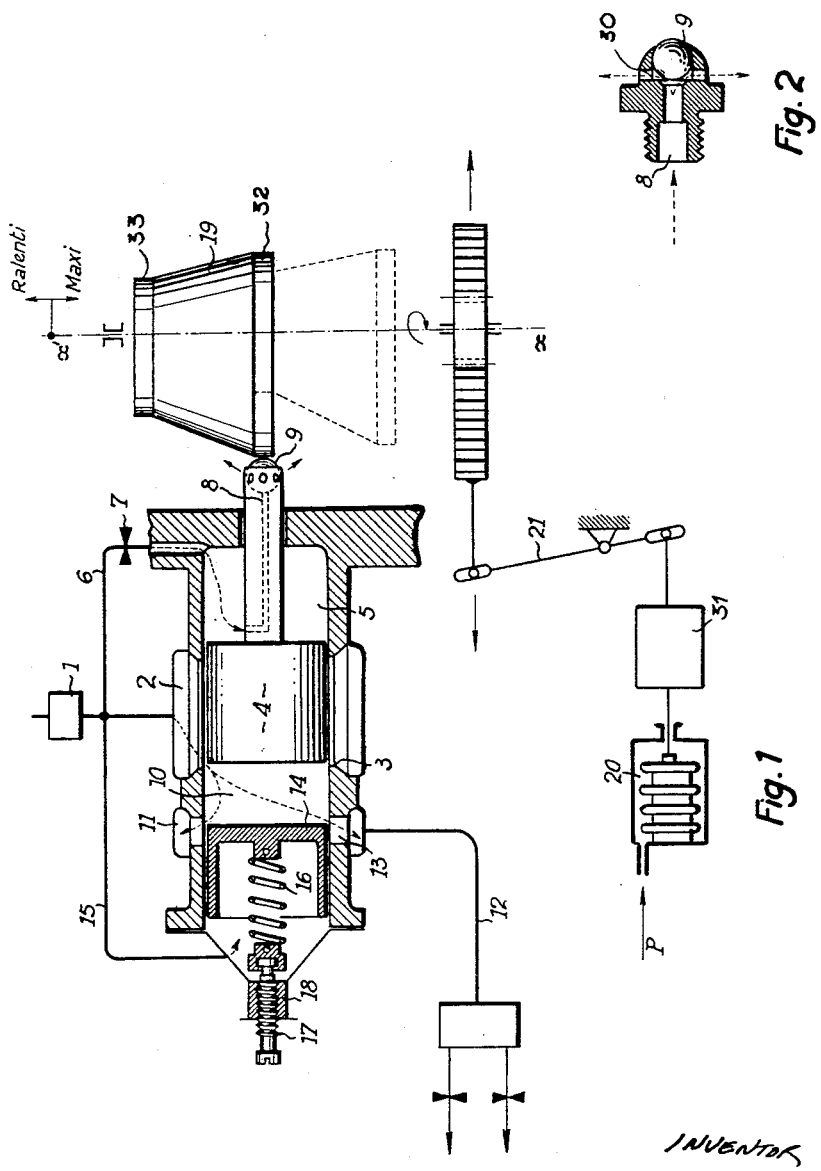

June 19, 1962 A. TRINKLER 3,039,988
REGULATION AND ADJUSTMENT OF THE RATES OF FLOW OF LIQUID
Filed July 26, 1960 4 Sheets-Sheet 2

INVENTOR
Alfred Trinkler
By Watson, Cole, Grindle & Watson
ATTORNEYS

June 19, 1962 A. TRINKLER 3,039,988
REGULATION AND ADJUSTMENT OF THE RATES OF FLOW OF LIQUID
Filed July 26, 1960 4 Sheets-Sheet 3

INVENTOR
Alfred Trinkler
By Watson, Cole, Grindle & Watson
ATTORNEYS

June 19, 1962 A. TRINKLER 3,039,988
REGULATION AND ADJUSTMENT OF THE RATES OF FLOW OF LIQUID
Filed July 26, 1960 4 Sheets-Sheet 4
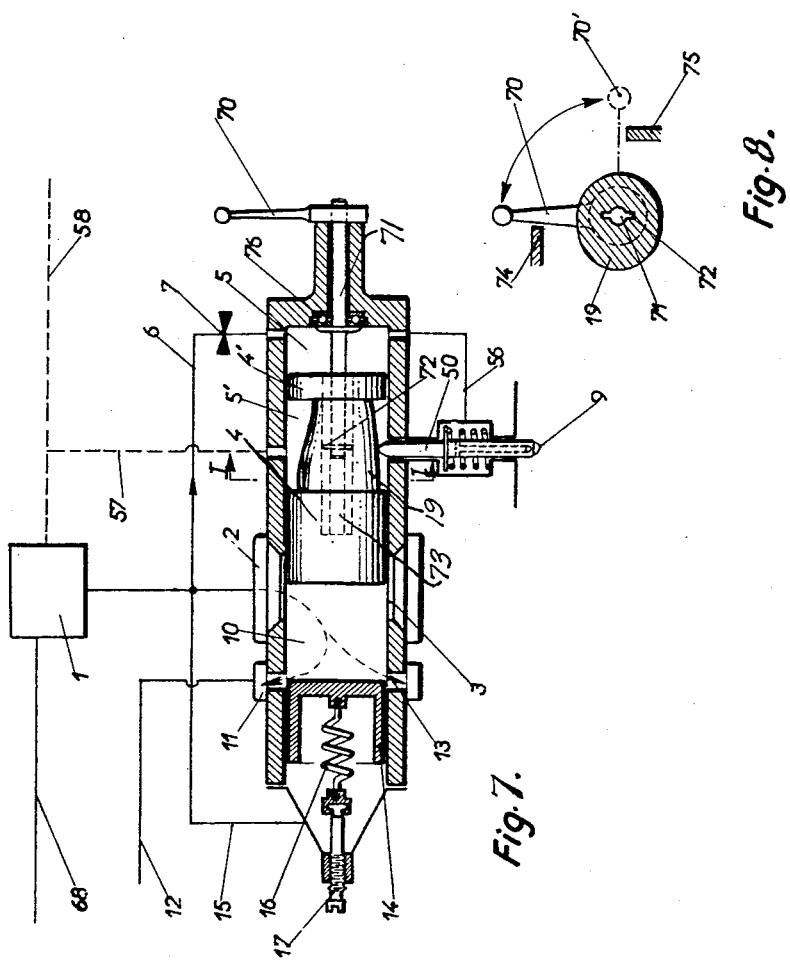
INVENTOR
Alfred Trinkler
By Watson, Cole, Grindle + Watson
ATTORNEYS _United States Patent Office_

3,039,988
Patented June 19, 1962

3,039,988
REGULATION AND ADJUSTMENT OF THE RATES OF FLOW OF LIQUID
Alfred Trinkler, Dammarie-les-Lys, France, assignor to Societe Nationale d'Etude & de Construction de Moteurs d'Aviation, Paris, France, a company of France
Filed July 26, 1960, Ser. No. 45,365
Claims priority, application France July 28, 1959
11 Claims. (Cl. 60—39.28)

The invention has for its object an improved device for regulating the rates of flow of a liquid as a function of one or two independent parameters, the apparatus serving itself as a servo control without any mechanical coupling liable to introduce errors due to clearances, friction or hysteresis, which provides a control at the same time extremely smooth and accurate.

The invention finds an especially advantageous application in the regulation and the control of reaction-propulsion units for aircraft and of the post-combustion devices with which these reactors are provided, but it could be applied to other fluids than fuels and applications to other fields of operation can readily be conceived.

The essential part of the invention is a piston-regulator which itself serves as a servo-motor under the action of the difference of pressure acting on its two faces, one of which receives the pressure of the fluid on the downstream side of the dosing or feed slots, while to the other is applied an opposing pressure regulated by a leakage controlled by means of a feeler in contact with a cam. This cam may eventually be of the so-called "three-dimensional" type, providing a double control, by rotation about an axis and by a movement of translation along the said axis, which permits of control by two independent variables. One of these will be for example the position of a handle operated by the machine operator and the other will be for example a characteristic pressure of the machine measured by a pressure capsule and amplified by any known device.

This cam may also be constituted by a lever or a movable stop. In addition, a regulating valve maintains a constant difference between the pressures on the upstream and downstream sides of the dosing slots, and this valve may be mounted in the same bore as the piston-regulator.

If the cam is "two-dimensional," this device thus controls the liquid flow by a parameter following a law which can only be modified by changing the cam. If the cam is "three-dimensional," the device effects the control of the rate of flow of liquid by two independent parameters, following a law which again can only be modified by changing the cam. Taking again the example cited, one of the parameters being the position of a handle actuated by the machine operator and the other parameter being a characteristic pressure P of the machine, the rate of flow C of liquid will be controlled by this pressure P following a law $C=f(P)$ which, if the operator of the machine does not effect any variation in the first parameter, can only be modified by changing the cam.

One or a number of adjusting members may be interposed between the rod of the piston-regulator and the feeler. These adjustments may be manual; they then permit of modification, without changing the cam, of the law which relates the rate of flow of liquid to the parameters which determine the displacements of this cam. In particular, in the example chosen, a simple construction enables the law $C=f(P)$ to be modified, this law causing each value of the characteristic pressure P of the machine to correspond to a value C of the flow of liquid: a first adjustment modifying the distance between the piston-regulator and the feeler, will cause the correspondence to each value of the pressure P of a value of the rate of flow C increased or diminished by a determined quantity, which is equivalent to a displacement by translation of a curve representing the law $C=f(P)$; a second adjustment, modifying the ratio of the displacements of the piston-regulator to those of the feeler, will cause the correspondance to each value of the pressure P of a value of the differential $$\frac{dC}{dP}$$

increased or diminished by a determined quantity, which is equivalent to a rotation of the curve $C=f(P)$.

It would still remain within the scope of the present invention to couple the adjustment devices interposed between the feeler and the piston regulator, not to a manual control, but to new parameters. In this way, there would be interposed in the device a regulation which is a function of these new parameters.

In another form of arrangement, the piston-regulator is coupled by a suitable kinematic device to the cam against which the feeler is applied, the leakage being determined by the pressure of the ball forming part of the said feeler on a moving system controlled in dependence on a parameter, for example on a characteristic pressure of the machine; the cam can also be controlled in dependence on another parameter, for example on the position of a control-lever worked by the operator of the machine.

The description which follows below with reference to the accompanying drawings (which are given by way of example only and not in any sense by way of limitation) will make it quite clear how the different particular features of the invention may be carried into effect, any arrangement brought out either in the text or in the drawings being understood to fall within the scope of the present invention.

FIG. 1 is a general arrangement drawing of a form of embodiment of the invention applied to the regulation of the supply of a turbo-reactor.

FIG. 2 is a detail view of the leakage device with a ball playing the part of a feeler.

FIG. 7 is a diagrammatic illustration of another form of embodiment of the piston-regulator and of the cam, in which a control-lever provides a means of varying the post-combustion pressure;

FIG. 8 is a view in cross-section, taken along I—I of FIG. 7, of the cam which is assumed to have been removed from the piston-regulator cylinder.

Figure 4:
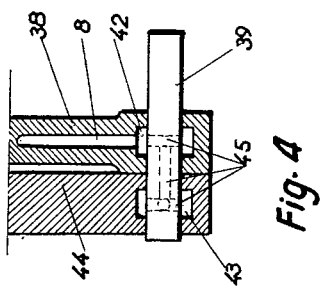
FIG. 4 is a detail view in cross-section along the line I—I of FIG. 3.

In the arrangement shown in FIGS. 1 and 2, the fuel coming from the centrifugal pump 1 passes into the annular chamber 2 supplying the dosing slots 3 which are symmetrically distributed along the periphery of the socket which receives the piston-regulator.

The chamber 5 on the right-hand side of the piston-regulator is supplied with liquid coming from the pump 1 through a piping system 6 comprising a restriction 7 in order to create a pressure-drop. The fuel passes out of the chamber 5 through a channel 8 drilled in the thickness of the rod of the piston 4 and is closed to a greater or less extent by a ball 9 which can move freely along the axis of the piston in a way 30 and which acts as a feeler. The jet of fuel which passes round the ball 9 is sent to the upstream side of the pump 1 through a circuit, not shown.

The fuel passing through the dosing slots 3 into the chamber 10 to the left of the piston 4 passes out through an annular collector 11 and a pipe 12 leading to the injectors through a bleeder and distribution device indicated by a rectangle.

The passage ports 13 between the chamber 10 and the collector 11 are more or less masked by the piston 14 of the regulator valve, on the left-hand face of which is applied the pressure of the liquid coming directly from the pump 1 through a pipe 15, but this piston 14 is drawn towards the left by a spring 16 adjustable by means of a screw 17.

The ball 9 is in contact with a cam 19 which can slide along and rotate about an axis $x—x'$.

The position of the cam is controlled manually for its movement of translation, and its angular position is determined by the pressure P taken at the delivery of the compressor of the turbo-reactor by means of a manometric device 20, an amplifier 31 and a lever 21.

The operation is as follows:

The cam 19 enables a control to be obtained by two parameters: for each value of the pressure P, that is to say for a given angular position of the cam, the position of the piston-regulator is a linear function of the position of the cam, controlled manually by the gas-supply handle along the axis $x—x'$, when the ball is resting against the central part of the cam. On the other hand, at the two extremities of the cam, when the ball is in contact with one of the parts 32 or 33, only one parameter is operative, the pressure P. If the cam is displaced so as to be applied harder against the ball, the leakage will be reduced and the pressure in the compartment 5 will increase; the piston 4 will move towards the left and the regulated rate of flow will be reduced until the pressures on its two faces are again in equilibrium. The rate of flow will increase if the cam is displaced in the reverse sense. In this way, there is obtained a servo-control in which the same piston acts simultaneously as a servo-motor and a piston-regulator, the only effort required from the initial control being to vary slightly the leakage determined by the position of the ball. It should be observed that the ball is automatically lubricated by the fuel which passes over it, and rolls over the surface of the cam or of a lever, irrespective of the direction of its displacement. This results therefore in a control having great smoothness and requiring a very small effort to actuate the cam. This device does not have any mechanical coupling liable to introduce errors due to clearances, friction or hysteresis. It enables the movement of the cam to be followed faithfully.

The piston 14 of the regulator valve has the function of maintaining constant the drop of pressure through the dosing slots. In fact, the said piston is subjected on the one hand to the pressure existing in the compartment 10, to which is added the tractive pull of the spring, and on the other hand to the supply pressure on the upstream side of the dosing slots. If, as a result of a variation in the supply pressure from the pump, the equilibrium of the piston is disturbed, the piston 14 is displaced and uncovers more or less the ports 13 to cause a variation in the pressure obtaining in the chamber 10 until a position of equilibrium is again obtained. It should here be noted that the displacements of the piston-regulator 4 under the influence of a variation of the difference in pressure between the compartments 10 and 5 are extremely small, in consequence of the great sensitivity of the slot defined by the ball 9 and its seating. These displacements can in practice be neglected.

Figure 3:
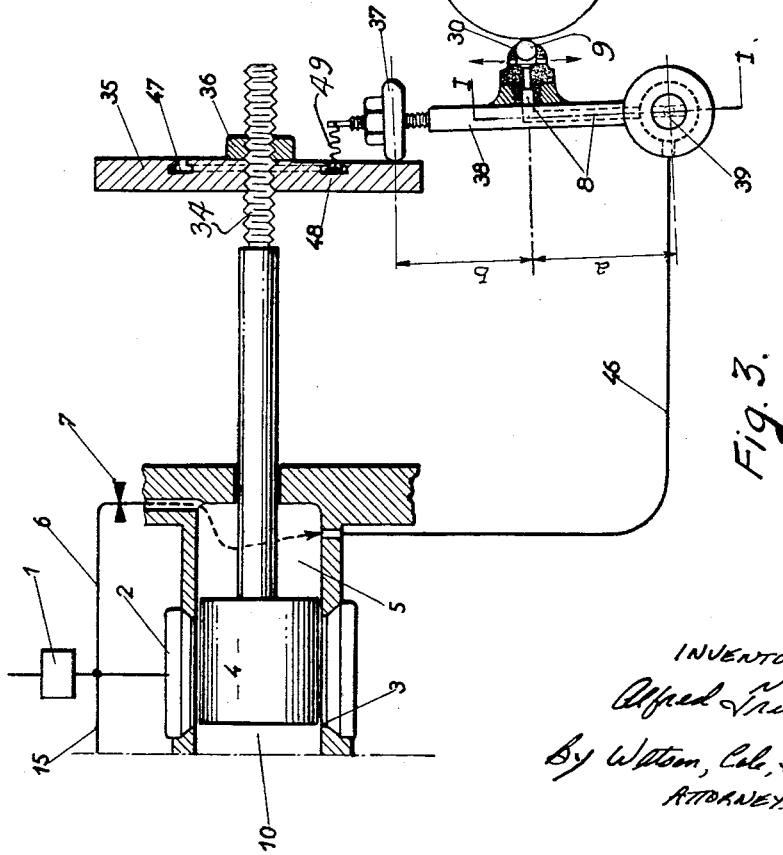
FIG. 3 is a general diagram of a further form of embodiment of the invention, applied to the device which is shown in FIG. 1.

In the form of embodiment shown in FIGS. 3 and 4, the same device is shown in its application to the regulation of the supply of a turbo-reactor, in which the fuel coming from the centrifugal pump 1 at a substantially constant pressure, passes into the annular chamber 2 which supplies the dosing slots 3, the chamber 5 being supplied by liquid coming from the pump 1 through the piping system 6 comprising the restriction 7, and being on the other hand in communication with the passage 8, more or less closed by the ball 9, which moves in the way 30 and is applied against the cam 19 so as to serve as a feeler. The chamber 10, supplied with fuel through the dosing slots 3, is in communication with the injectors through the intermediary of a regulating valve. The cam 19 is of the "three-dimensional" type. Its movement of translation is controlled manually and its angular position is determined by the pressure taken at the delivery of the compressor of the turbo-reactor.

Figure 5:
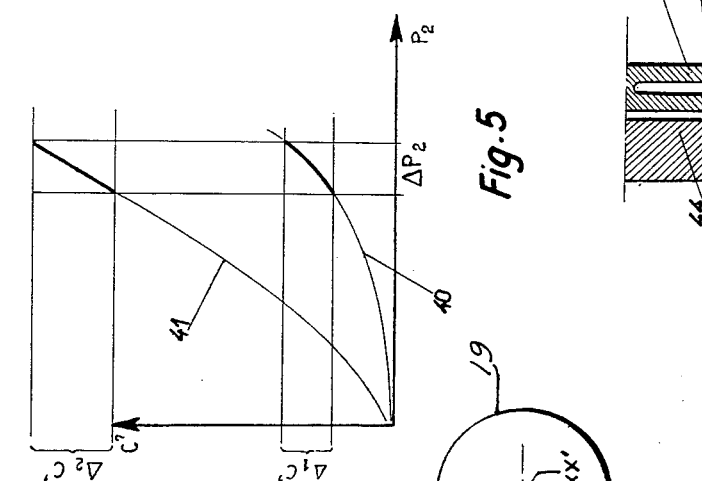
FIG. 5 is a representation in Cartesian co-ordinates of the law of correspondence of the rate of flow of liquid to a characteristic pressure of the machine.

Following the previous designation, this pressure will be called $P_2$ and the flow of fuel sent to the injectors will be designated $C'$. In the device described in FIGS. 1 and 2, the piston-regulator, acting itself as a servo-motor as explained above, causes a value of the rate of flow $C'$ to correspond to each value of the pressure $P_2$, when no movement of translation is given to the cam 19; the law of correspondence $C'=f(P_2)$ is shown in FIG. 5 by the curve 40, with a shape determined by the cam 19 and for a certain position of the manual control of the movement of translation of the said cam.

According to the form of embodiment of FIGS. 3 and 4, the extremity 34 of the rod of the piston-regulator 4 is threaded to receive a tapped disc 35 and a locking nut 36; the distance between the piston-regulator 4 and the disc 35 may be modified by screwing up or unscrewing the disc on the threaded rod 34. The feeler, comprising the way 30 and the movable ball 9, is fixed on a lever 38 of which one extremity is threaded while the other extremity is movable about the shaft 39; the threaded extremity receives a tapped disc 37 with a rounded rim and a lock-nut. The distance $a+b$ between the shaft 39 and the disc 37 can be modified by screwing up or unscrewing this disc on the threaded extremity of the lever 38; the lock-nut is used to lock the disc 37 on this threaded extremity. The feeler communicates with the chamber 5, on the right-hand side of the piston-regulator through the intermediary of a universal coupling, under the following conditions: the passage 8 which opens into the way 30 of the feeler, is drilled in the thickness of the lever 38 and flares out into the form of a circular chamber 42; a circular chamber 43 is formed in the support 44 of the shaft 39; a passage 45, drilled in the thickness of the shaft 39, provides a communication between the two chambers 42 and 43; a conduit system 46 puts the chamber 43 into communication with the chamber 5 on the right hand side of the piston-regulator. This chamber 5 is thus in communication with the feeler, irrespective of the position of the lever 38 about its shaft 39, by the conduit system 46, the chamber 43, the passage 45, the chamber 42 and the passage 8 which terminates in the way 30 of the said feeler. The rounded rim of the disc 37 is applied against the disc 35 by a spring 49, fixed on the one hand to the extremity of the lever 38 and on the other hand to the sliding block 48 which is imprisoned in the groove 47 of the disc 35. The rounded rim of the disc 37 ensures correct contact between the latter and the disc 35 in any position whatever of this disc 37 on the lever 38, and irrespective of the position of the cam 19, in contact with the ball 9 of the feeler. The ball 9 of the feeler is in contact with the cam 19, which is shown in transverse cross-section in FIG. 1, for a determined position of the manual control of the movement of translation of the said cam 19.

The operation is as follows:

As has been explained above, the piston-regulator 4 is controlled by the cam 19: any displacement of this cam caused by a variation of the pressure $P_2$, modifies the rate of leakage flow between the ball 9 and the way 30 of the feeler, and in consequence, the equilibrium of the pressures between the two faces of the piston is also modified; the piston 4 immediately finds a new position of equilibrium by moving laterally through a distance $l$ such that the feeler is again applied on the cam in such manner that the rate of leakage flow is brought back to its first value, enabling the balance of the piston 4 to be precisely obtained. This new position of equilibrium of the piston 4 produces a new value of the opening of the dosing slots 3, and consequently gives a new value of the rate of flow $C'$.

In the device of FIGS. 1 and 2, the feeler 30 was fixed to the rod of the piston 4, so that this feeler is displaced through the same distance $l$ as the piston 4. In the form of embodiment shown in FIG. 3, when the discs 35 and 37 occupy a certain position on their respective shafts, a lateral movement $l$ of the piston 4 results, for the disc 35, in the same lateral displacement $l$ and a rotation of the feeler 30 about the shaft 39, which rotation may be assimilated, in the case of small displacements, to a translation parallel to that of the piston 4 and having an amplitude $$l \times \frac{a}{a+b}$$

where $a$ is the distance between the shaft 39 and the point of fixation of the feeler on the lever 38, while $b$ is the distance between this point and the disc 37.

The device operates in the manner described above, since the leakage of the feeler 30 is in communication with the chamber 5, on the right-hand side of the piston 4, and to each value of the pressure $P_2$ at the delivery of the compressor there will correspond a value of the rate of flow $C'$ of the fuel consumed, following a law $C'=f(P_2)$ shown in FIG. 3 by the curve 40.

If the disc 35 is displaced on the rod 34 by a fixed distance $m$ towards the left or towards the right respectively, to each position of the cam 19 there will correspond a position of the piston-regulator 4, displaced through the distance $m$ towards the right or respectively towards the left, giving a consequent increase or decrease in the uncovered length or the dosing slots 3. Finally, to any value of the pressure $P_2$ which determines the position of the cam 19, there will correspond an opening of the dosing slots 3 which is increased or respectively diminished by the fixed distance $m$; this will result in turn in an increase or a reduction respectively of the rate of flow $C'$ by a quantity K, which we can assume to be constant. For example, for the law $C'=f(P_2)$ there will have been substituted the law $C'=f(P_2)+K$, where K is a constant. This is equivalent to displacement by translation of the curve 40 of FIG. 5, parallel to one of the ordinates.

If it is the disc 37 which is displaced on the lever 38 by a distance $c$ towards the top or respectively towards the bottom, the ratio $$\frac{\Delta C'}{\Delta P_2}$$

of the variations of the flow $C'$ to those of the pressure $P_2$ is correspondingly increased. If it is assumed in fact that the rate of flow $C'$ is a linear function of the uncovered length of the dosing slots 3, this ratio $$\frac{\Delta C'}{\Delta P_2}$$

is equal to the ratio of the displacements $l$ of the piston 4 to the displacements $$l \times \frac{a}{a+b}$$

of the feeler 30. If therefore it is possible to write that the ratio $$\frac{\Delta_1 C'}{\Delta P_2}$$

for the curve 40 is equal to $$\frac{a+b}{a}$$

by adding to the length $b$ a fixed length $c$, there will be obtained a new curve 41, for which the ratio $$\frac{\Delta_2 C'}{\Delta P_2}$$

of the variations of $C'$ to those of $P_2$ is equal to $$\frac{a+b+c}{a}$$

Passing to the limit, it can be seen that the differential $$\frac{dC'}{dP_2}$$

of the function $C'=f(P_2)$ which represents the law of correspondence has been increased by a constant quantity. This is equivalent to replacing the curve 40 by a new curve 41 which has been turned through a certain angle, and giving for the same variation of the pressure $P_2$ a greater increase in the rate of flow. If the length $b$ had been reduced instead of being increased, there would have been obtained, on the contrary, a smaller increase in flow.

Figure 6:
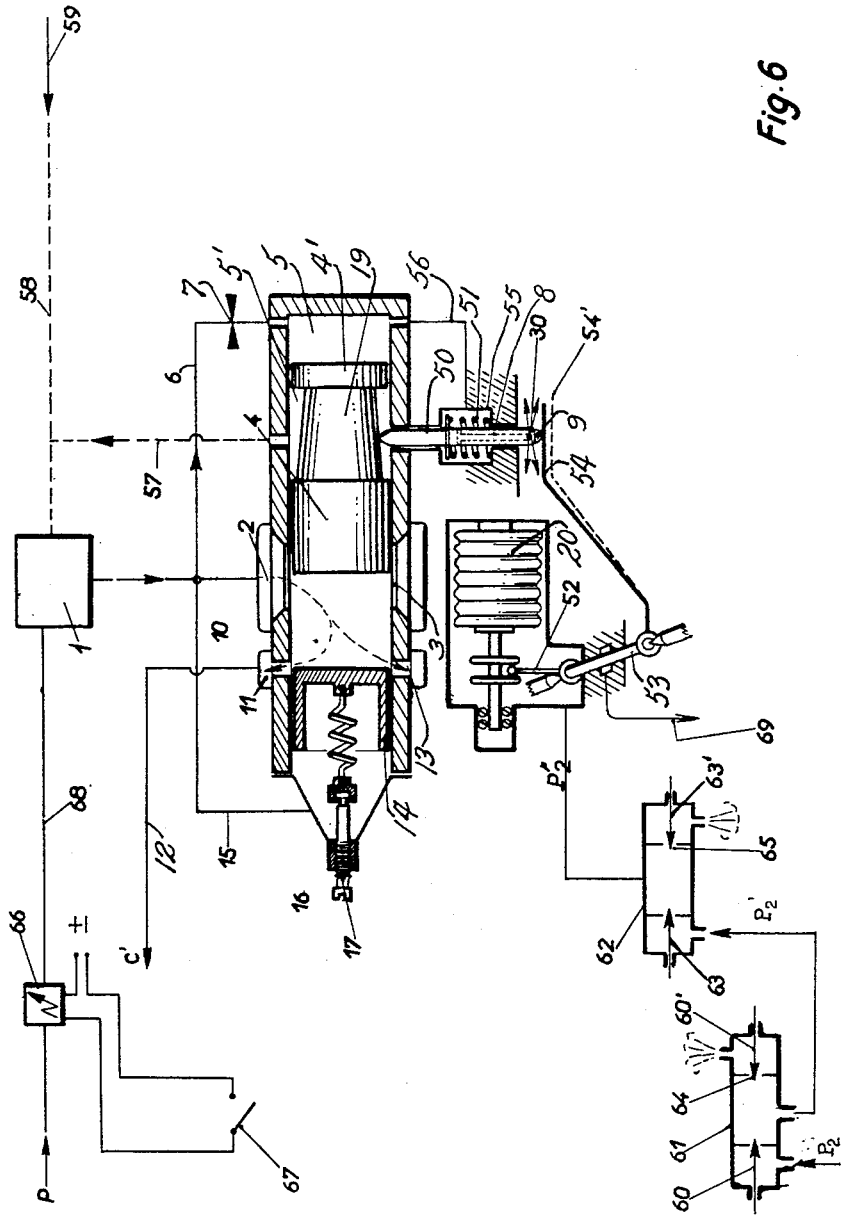
FIG. 6 is a general diagram of another form of embodiment of the invention applied to the regulation of the rate of flow C' of the supply of the post-combustion of a turbo-reactor as a function of the delivery pressure $P_2$ of the compressor.

In the forms of construction which are illustrated in FIGS. 6 and 7, the piston-regulator comprises two bodies 4 and 4', located on each side of the cam 19 so as to form an equipment unit in conjunction with the said cam; the chamber 5 is on the right hand side of the body 4'; an intermediate chamber 5' is situated between the bodies 4 and 4' and round the cam 19. The central bore 30 is fixed to one extremity of a rod 50 which is thrust upwards by a spring 51 in such manner that its other extremity is applied against the cam 19. The ball 9 is in contact with the lever 54 which forms part of a moving system 52, 53, 54, the position of which is determined by the pressure $P_2$ taken at the delivery of the reactor-tube compressor by means of a pressure-gauge device 20, as will be explained below. The central bore 30 is in communication with the chamber 5 through the intermediary of the channel 8 which is drilled in the thickness of the rod 50 of the feeler, the said channel 8 opening at one end into the said central bore 30 and at the other end into the chamber 55, which communicates with the chamber 5 through the pipe 56; the sealing ring provided round the rod 50 at the point at which the latter passes outside the chamber 55, is provided by known means. The return conduit 57, which starts from the intermediate chamber 5' and ends in the pipe 58 which supplies the centrifugal pump 1 from the turbo-reactor supply pump shown diagrammatically by the arrow 59, makes it possible to maintain the same pressure in the said intermediate chamber 5' at all times, either by admitting or evacuating the small volume of fuel corresponding to the upward or downward movement of the rod 50.

The moving system 52, 53, 54 comprises a bell-crank lever constituted by the lever 52, the shaft 53 and the lever 54 with which the ball 9 is in contact, the lever 52 being designed to follow the movements of a manometric capsule 20 in which a vacuum has been created, when there is a variation of the pressure $P''_2$ which surrounds the said capsule 20. This pressure $P''_2$ is the pressure $P_2$ of the delivery of the turbo-reactor compressor after reduction in the two pressure-reducers 61 and 62 of known type, the needles 60' and 63' being adjusted in such manner that, when the air passing through the diaphragms 64 and 65 has reached sonic speed, the factors of reduction $$\frac{P'_2}{P_2}$$

on the one hand and $$\frac{P''_2}{P'_2}$$

on the other hand remain constant. The needles 60 and 63 are provided to permit the adaptation of the device to installations in which it is required to be put into service. For example, the needle 60 will be adjusted once and for all in order to compare the variations of thrust between one reactor and another and the needle 63 will be adjusted once and for all for the purpose of compensating irregularities of manufacture of the capsule 20. When thus adjusted, the pressure-reducers make it possible to obtain a pressure $P''_2$ which is proportional to the pressure $P_2$ in a constant ratio, the said pressure $P''_2$ being adapted to the mechanical strength of the capsule 20, while the variations of the said pressure $P''_2$ are adapted to the amplitude of movement which it is desired to impart to the moving system 52, 53, 54. The shaft 53 is mounted between points and the draining-off pipe 69 provides a means of recovering the air leakage which takes place round the said shaft 53 as it passes through the walls of the chamber which surrounds the capsule 20.

The pump 1 is of the centrifugal type and operates under a substantially constant pressure. It comprises hydraulic admission valves, which are not shown in the drawings, operated by a control pressure $p$ which can be applied to them, for example, by means of the electro-valve 66, which is in turn controlled by the switch 67. The pressure $p$, which can, for example, be supplied by the fuel pump, is conveyed to the admission valves of the centrifugal pump 1 through the pipe 68. By opening or closing the valve 66, the operation of the switch 67 either opens or closes the said valves which control the admission to the centrifugal pump 1 of the fuel which arrives through the pipe 58, and thus the post-combustion regulation and supply device operates on the principle of all or nothing.

The operation is as follows:

An increase of the pressure $P_2$ of the delivery of the compressor, which is reduced in a constant ratio by the pressure-reducers 61 and 62, produces a proportional increase in the pressure $P''_2$ in the same ratio. This increase in the pressure $P''_2$ produces a contraction of the manometric capsule 20, which moves towards the right hand side, thereby driving in its movement the lever 52 and the moving system 52, 53, 54, which then rotates in a clockwise direction about the shaft 53, while the lever 54 moves downwards to occupy, for example, the position 54'. Since the feeler rod 50 remains applied by the spring 51 against the cam 19, the leakage round the ball 9 increases, thereby producing a drop of pressure in the chamber 5. Under the opposing action of the pressure which exists in the chamber 10, the combined unit of the piston 4, 4' and the cam 19 moves to the right until it has taken up a new position of equilibrium in which the feeler 50, still applied against the cam 19, has moved downwards in such manner that the ball 9 comes in contact with the lever in the position 54' under the same conditions in which it was previously in contact with the said lever in the position 54, the leakage round the said ball 9 having thus returned to its previous value and the pressure in the chamber 5 having consequently also been restored to its previous value. As has been stated above, the lowering of the rod 50 produces no variation in pressure in the intermediate chamber 5', the pressure in the said intermediate chamber 5' being maintained constant by virtue of the return pipe 57. If the pressure $P_2$ had decreased instead of increasing, the operation would have taken place in reverse, namely, the lever 54 would have moved upwards, the leakage round the ball 9 would have decreased, the piston-regulator 4 taking up a new position of equilibrium towards the left hand side so as to restore this leakage to its initial value.

The operation of the left hand portion of the device has been described with reference to FIGS. 1 and 2: the increases or respective decreases in the pressure $P_2$ create an increase or respectively a decrease in the rate of flow C' of fuel passing through the dosing slots 3, the chamber 10, the annular collector 11 and the pipe 12 which leads to the injectors; the piston 14 of the regulator valve maintains constant the drop of pressure through the dosing slots 3.

In the arrangement which is illustrated in FIG. 6, the cam 19 is of revolution about its shaft and the accidental rotation of the equipment unit constituted by the two bodies 4 and 4' of the piston and this cam 19 is without effect. In the arrangement which is illustrated in FIGS. 7 and 8, the cam 19 is not of revolution and its rotational movements are controlled by the control-lever 70 which is fixed to the shaft 71. This latter drives in rotation the combined unit of the cam 19 and the bodies 4 and 4' of the piston-regulator by means of a sliding key unit comprising the key 72, which slides in the groove 73 bored in the thickness of the said cam 19, and bodies 4 and 4' of the said regulator-piston. At the outlet of the chamber 5, the shaft 71 is mounted on a ball-bearing 76, completed by a sealing device, not shown in the drawings. The abutment members 74 and 75 limit the rotary displacements of the control-lever 70; FIG. 8 shows the said control-lever in the low-pressure position 70 and in the maximum position 70' corresponding to the maximum post-combustion pressure.

At low-pressure, that is, when the control-lever is in the position 70, the profile of the cam 19 which is in contact with the feeler 50 is such that the rate of flow C', controlled in dependence on the position $P_2$ by the operation of the piston-regulator, is at the minimum; it is then said that the post-combustion pressure is at the minimum; when the position of the control-lever 70 is altered, this changes the profile of the cam 19 in contact with the feeler 50 and the said cam 19 is so designed that the post-combustion pressure, which is also controlled by the pressure $P_2$, constantly increases as the control-lever is displaced from the position 70 to the position 70'. In each of the positions of the control-lever 70, the device works in exactly the same way as in FIG. 6, while the sliding key 72 does not prevent in any way the movements of translation of the equipment unit constituted by the piston-regulator 4, 4', and the cam 19.

What I claim is:

1. A device for regulating the flow of a fluid, in particular a flow of fuel supplied to a combustion machine, as a function of a parameter, comprising a cylinder body, a piston-regulator slidably mounted in the cylinder body so as to define in said cylinder a first chamber and a second chamber, dosing slots cut in the wall of the cylinder body, said dosing slots opening in the first chamber and being so arranged as to be more or less uncovered by the piston-regulator sliding in the cylinder, means for feeding the fluid into said first chamber through said dosing slots and into said second chamber, outlet ports cut in the wall of the first chamber, so that the fluid may flow through said dosing slots, said first chamber and said outlet ports, a feeler member bound physically with the piston-regulator so as to follow its sliding movement, a nozzle carried by said feeler member and communicating with the second chamber, a cam member the position of which is a function of the parameter and a ball lodged in the feeler member, said ball being applied against the cam member and serving directly as a regulating valve to permit venting of fluid in said second chamber through the nozzle, by being more or less applied against said nozzle.

2. A device in accordance with claim 1, comprising in the same cylinder body as the piston-regulator a second piston arranged to slide in said cylinder body so as to uncover more or less the outlet ports of the first chamber, spring means loading said second piston and means for feeding the fluid into the chamber located between said second piston and the bottom of the cylinder body, said second piston having the function of a regulating valve.

3. A device in accordance with claim 1, in which the cam member is arranged so as to permit the control as a function of two independent parameters, one parameter determining the relation of the cam around a shaft and the other the translatory movement of the cam along the said shaft.

4. A device in accordance with claim 1, in which there is interposed in the coupling connecting the piston-regulator to the feeler member at last one adjustable member enabling the law of correspondence to be modified between the displacement of the cam member and that of said piston-regulator.

5. A device in accordance with claim 4, in which the feeler device is in communication with the cylinder of the piston-regulator through the intermediary of a passage bored in the thickness of the lever and of a hinged joint.

6. A device in accordance with claim 4, in which the physical binding of the feeler member with the piston-regulator includes a threaded piston rod integral with said piston regulator, a tapped disc screwed on the threaded piston rod, a lever member carrying said feeler member and means to apply said lever member on the tapped disc.

7. A device in accordance with claim 6, in which the lever carrying the feeler device is threaded to receive a tapped disc which can be locked by a locking-nut, the rim of the said disc being rounded and being applied by a spring against the disc screwed on the rod of the piston-regulator.

8. A device for regulating the flow of a fluid, in particular a flow of fuel supplied to a combustion machine, as a function of a parameter, comprising a cylinder body, a piston-regulator slidably mounted in the cylinder body so as to define in said cylinder a first chamber and a second chamber, dosing slots cut in the wall of the cylinder body, said dosing slots opening in the first chamber and being so arranged as to be more or less uncovered by the piston-regulator sliding in the cylinder, means for feeding the fluid into said first chamber through said dosing slots and into said second chamber, outlet ports cut in the wall of the first chamber, so that the fluid may flow through said dosing slots, said first chamber and said outlet ports, a cam member integral with the piston-regulator, a feeler member applied against said cam member by resilient means so that said feeler member is moved in accordance with the sliding movement of the piston regulator, a nozzle carried by said feeler member and communicating with the second chamber, a moving device controlled by the parameter, a lever member being a part of said moving device and a ball lodged in the feeler member, said ball being applied against said lever member and serving directly as a regulating valve to permit venting of fluid in said second chamber through the nozzle, by being more or less applied against said nozzle.

9. A device in accordance with claim 8, in which the cam member constitutes, together with the piston-regulator, a one-piece equipment unit, the feeler device being mounted on a rod, one extremity of the said rod being biased by a spring against the said cam, the said feeler device having a ball lodged therein and serving directly as a regulating valve to permit venting of fluid in the second chamber through the nozzle, by being more or less applied against said nozzle by a lever member which is a part of a moving system including a manometric capsule controlled by the parameter.

10. A device in accordance with claim 8, in which the cam member is provided with a control lever for turning it together with the piston-regulator about the axis of the cylinder, by means of a shaft and a sliding key, so as to change the profile of said cam against which the feeler member is applied when the piston regulator slides in the cylinder.

11. A device in accordance with claim 9, in which the rate of flow as regulated by the said device is the rate of fuel-flow and in which the parameter controlling the moving device with which the ball of the feeler member is in contact is the pressure of the delivery of the compressor of the said turbo-reactor, this pressure being expanded in a constant ratio by at least two pressure-reducing devices before being applied to the manometric capsule to which the said moving system is coupled, each of the said pressure-reducing devices comprising at leaset one regulating means.

References Cited in the file of this patent

UNITED STATES PATENTS

| | | |
|---|---|---|
| 2,834,375 | Gallo et al. | May 13, 1958 |
| 2,938,339 | Clarke | May 31, 1960 |
| 2,938,341 | Miller | May 31, 1960 |